US012686635B2

(12) United States Patent
Ishizuki et al.

(10) Patent No.: US 12,686,635 B2
(45) Date of Patent: Jul. 21, 2026

(54) COLORED OPTICAL FIBER, OPTICAL FIBER RIBBON, OPTICAL FIBER RIBBON CABLE AND METHOD FOR MANUFACTURING THE SAME

(71) Applicant: FURUKAWA ELECTRIC CO., LTD., Tokyo (JP)

(72) Inventors: Kuniaki Ishizuki, Tokyo (JP); Minoru Kasahara, Tokyo (JP); Mitsuhiro Iwaya, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 139 days.

(21) Appl. No.: 18/536,408

(22) Filed: Dec. 12, 2023

(65) Prior Publication Data

US 2024/0116808 A1      Apr. 11, 2024

Related U.S. Application Data

(63) Continuation of application No. PCT/JP2022/022896, filed on Jun. 7, 2022.

(30) Foreign Application Priority Data

Jun. 14, 2021      (JP) ................................. 2021-098968

(51) Int. Cl.
C03C 25/1065          (2018.01)
C03C 25/105          (2018.01)

(52) U.S. Cl.
CPC ........ C03C 25/1065 (2013.01); C03C 25/105 (2013.01); C03C 2218/32 (2013.01)

(58) Field of Classification Search
CPC . C03C 25/1065; C03C 25/12; C03C 2218/32; C03C 25/475; C03C 25/105; G02G 6/44
USPC ......................................................... 428/375
See application file for complete search history.

(56) References Cited

U.S. PATENT DOCUMENTS

| | | | |
|---|---|---|---|
| 5,373,578 A | 12/1994 | Parker et al. | |
| 6,243,523 B1 | 6/2001 | Aloisio et al. | |
| 2010/0183821 A1* | 7/2010 | Hartsuiker | ............. B05D 3/067 |
| | | | 427/513 |
| 2017/0242187 A1* | 8/2017 | Iwaguchi | ............. G02B 6/4403 |
| 2018/0156996 A1 | 6/2018 | Iwaguchi et al. | |

(Continued)

FOREIGN PATENT DOCUMENTS

| | | |
|---|---|---|
| JP | 7-215737 A | 8/1995 |
| JP | 2001-56423 A | 2/2001 |

(Continued)

OTHER PUBLICATIONS

International Search Report issued Aug. 23, 2022 in PCT/JP2022/022896 filed on Jun. 7, 2022, 3 pages.

*Primary Examiner* — Camie S Thompson
(74) *Attorney, Agent, or Firm* — Oblon, McClelland, Maier & Neustadt, L.L.P.

(57) ABSTRACT

A colored optical fiber includes a bare optical fiber, a primary layer formed of a first ultraviolet curing resin covering the bare optical fiber and a secondary layer formed of a second ultraviolet curing resin covering the primary layer. An outer diameter of the secondary layer is smaller than or equal to 210 μm. A Young's modulus of the primary layer is smaller than or equal to 88% with respect to a saturated Young's modulus of the primary layer.

15 Claims, 5 Drawing Sheets

1

(56) References Cited

U.S. PATENT DOCUMENTS

| | | | |
|---|---|---|---|
| 2020/0026012 A1* | 1/2020 | Murata | ............. G02B 6/02395 |
| 2020/0026013 A1 | 1/2020 | Murata et al. | |

FOREIGN PATENT DOCUMENTS

| | | |
|---|---|---|
| WO | WO 2017/065274 A1 | 4/2017 |
| WO | WO 2017/122589 A1 | 7/2017 |
| WO | WO 2018/062364 A1 | 4/2018 |
| WO | WO 2018/062365 A1 | 4/2018 |

* cited by examiner

FIG. 6

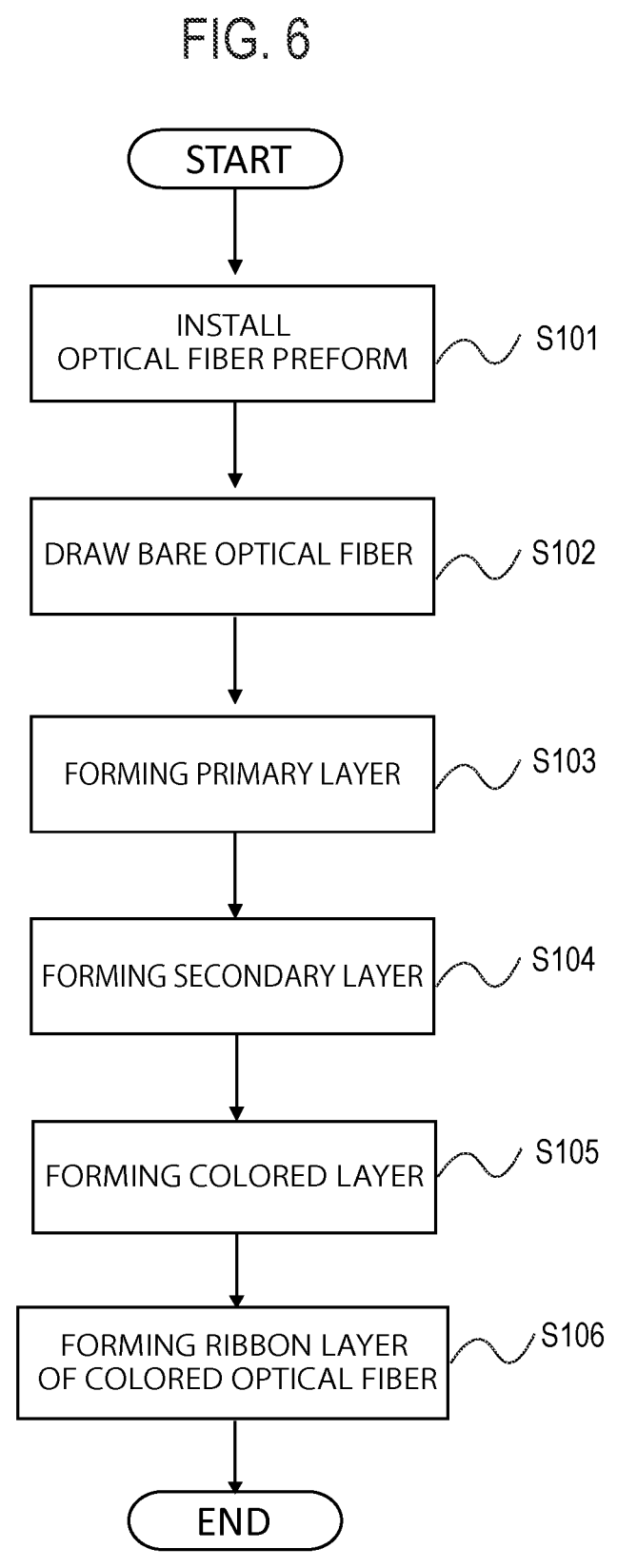

START

INSTALL
OPTICAL FIBER PREFORM — S101

DRAW BARE OPTICAL FIBER — S102

FORMING PRIMARY LAYER — S103

FORMING SECONDARY LAYER — S104

FORMING COLORED LAYER — S105

FORMING RIBBON LAYER
OF COLORED OPTICAL FIBER — S106

END

COLORED OPTICAL FIBER, OPTICAL FIBER RIBBON, OPTICAL FIBER RIBBON CABLE AND METHOD FOR MANUFACTURING THE SAME

CROSS-REFERENCE TO RELATED APPLICATIONS

This application is a Continuation of International Patent Application No. PCT/JP2022/022896, filed Jun. 7, 2022, which claims the benefit of Japanese Patent Application No. 2021-098968, filed Jun. 14, 2021, both of which are hereby incorporated by reference herein in their entirety.

BACKGROUND OF THE INVENTION

Field of the Invention

The present invention relates to a colored optical fiber, an optical fiber ribbon, an optical fiber ribbon cable and a method for manufacturing the same.

Description of the Related Art

In a coated optical fiber, a technique in which a primary layer covering a bare optical fiber and a secondary layer covering the primary layer are set to a desired Young's modulus respectively by an ultraviolet curing resin (International Publication No. 2018-062364 and International Publication No. 2018-062365) is known. For example, a Young's modulus of the primary layer is set to be small, and the primary layer absorbs an external force applied to the bare optical fiber, thereby suppressing a transmission loss of light due to small deformation of the bare optical fiber (microbend loss). A Young's modulus of the secondary layer is set to be larger than the Young's modulus of the primary layer, and the secondary layer protects the bare optical fiber and the primary layer from external force.

SUMMARY OF THE INVENTION

However, International Publication No. 2018-062364 and International Publication No. 2018-062365 only describe a typical coated optical fiber having a diameter of about 250 μm. A coated optical fiber having a small diameter has a relatively thin primary layer and secondary layer. Therefore, in the case of the coated optical fiber having a small diameter, there is a problem that the primary layer cannot sufficiently buffer the external force, and the microbend loss can be increased.

In view of the above problems, the present invention intends to effectively suppress a microbend loss in a colored optical fiber with a coated optical fiber having a small diameter.

According to an aspect of the present invention, there is provided a colored optical fiber including a bare optical fiber, a primary layer formed of a first ultraviolet curing resin covering the bare optical fiber and a secondary layer formed of a second ultraviolet curing resin covering the primary layer. An outer diameter of the secondary layer is smaller than or equal to 210 μm. A Young's modulus of the primary layer is smaller than or equal to 88% with respect to a saturated Young's modulus of the primary layer.

According to another aspect of the present invention, there is provided a method for manufacturing a colored optical fiber including a step of drawing a bare optical fiber from an optical fiber preform, a step of forming a primary layer by applying a first ultraviolet curing resin around the bare optical fiber and a step of forming a secondary layer by applying a second ultraviolet curing resin around the primary layer and irradiating the second ultraviolet curing resin with ultraviolet light. After manufacturing the colored optical fiber, an outer diameter of the secondary layer is smaller than or equal to 210 μm, and a Young's modulus of the primary layer is smaller than or equal to 88% with respect to a saturated Young's modulus of the primary layer.

According to the present invention, it is possible to effectively avoid microbend loss in a colored optical fiber with a coated optical fiber having a small diameter.

BRIEF DESCRIPTION OF THE DRAWINGS

FIG. 6 is a flowchart of the method for manufacturing the optical fiber ribbon according to the second embodiment.

DESCRIPTION OF THE EMBODIMENTS

Embodiments according to the present invention will be described below with reference to the drawings. Throughout the drawings, components having the same function are labeled with the same references, and the repetitive description thereof will be omitted.

First Embodiment

Figure 1:
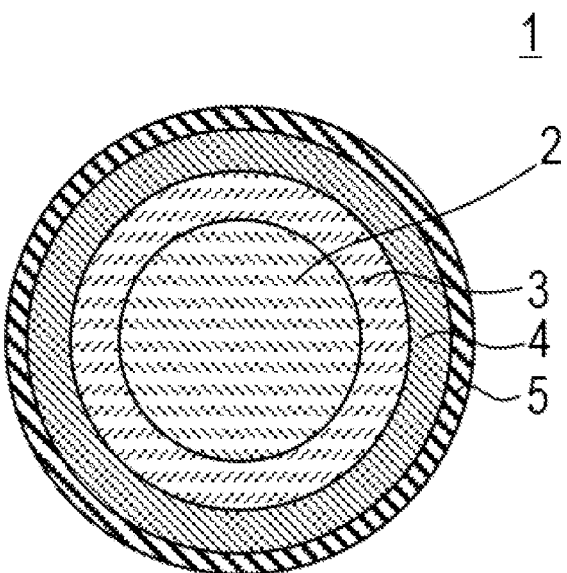
FIG. 1 is a cross-sectional view of a colored optical fiber according to a first embodiment.

FIG. 1 is a cross-sectional view of a colored optical fiber 1 according to a first embodiment. The colored optical fiber 1 includes a bare optical fiber 2, a primary layer 3 covering the outer periphery of the bare optical fiber 2, a secondary layer 4 covering the outer periphery of the primary layer 3, and a colored layer 5 covering the outer periphery of the secondary layer 4. The bare optical fiber 2 is covered with three covering layers of a primary layer 3, a secondary layer 4, and a colored layer 5. The fiber before the colored layer 5 is formed is referred to as a coated optical fiber.

The bare optical fiber 2 is formed of quartz glass or the like, for example, and transmits light. The primary layer 3, the secondary layer 4, and the colored layer 5 are formed by curing an ultraviolet curing resin by irradiation with ultraviolet light. The ultraviolet curing resin is not particularly limited as long as it can be polymerized by irradiation with ultraviolet light. The ultraviolet curing resin may be a resin that can be polymerized by photoradical polymerization or the like, for example. The ultraviolet curing resin may be an ultraviolet curing resin having a polymerizable unsaturated group such as an ethylenic unsaturated group polymerized and cured by ultraviolet light such as urethane (meth)acrylates such as polyether-based urethane (meth)acrylates and polyester-based urethane (meth)acrylates, epoxy (meth) acrylates, polyester (meth)acrylates, or the like, for example, and it is preferable that the resin have at least two polymerizable unsaturated groups. A polymerizable unsaturated group in the ultraviolet curing resin may be, for example, a group having an unsaturated double bond such as a vinyl group, an allyl group, an acryloyl group, a methacryloyl group, or the like, a group having an unsaturated triple bond such as a propargyl group, or the like. The acryloyl group and the methacryloyl group are preferable out of the groups described above in terms of polymerizability. The ultraviolet curing resin may be a monomer, an oligomer, or a polymer that initiates polymerization by ultraviolet irradiation to be cured and preferably is an oligomer. Note that the oligomer is a polymer having a degree of polymerization of 2 to 100. Further, in the present specification, the term "(meth)acrylates" means one or both of acrylates and methacrylates. The ultraviolet curing resin contains an arbitrary photopolymerization initiator having sensitivity in the ultraviolet region.

Polyether-based urethane (meth)acrylate is a compound having a polyether segment, (meth)acrylate, and a urethane bond as with a product in a reaction of polyol having a polyether framework with an organic polyisocyanate compound and hydroxyalkyl (meth)acrylate. Further, polyester-based urethane (meth)acrylate is a compound having a polyester segment, (meth)acrylate, and a urethane bond as with a product in a reaction of polyol having a polyester framework with an organic polyisocyanate compound and hydroxyalkyl (meth)acrylate.

Further, the ultraviolet curing resin may include, for example, a diluent monomer, a photosensitizer, a chain transfer agent, and various additives in addition to an oligomer and a photopolymerization initiator. As a diluent monomer, monofunctional (meth)acrylate, or polyfunctional (meth)acrylate is used. The diluent monomer here means a monomer used for diluting an ultraviolet curing resin.

The primary layer 3 is a soft layer and has a function of buffering an external force applied to the bare optical fiber 2. When the maximum Young's modulus that the resin can express is defined as "saturated Young's modulus", the primary layer 3 preferably has Young's modulus smaller than or equal to 88% with respect to the saturated Young's modulus. The Young's modulus increased by additionally irradiating a coated optical fiber or a colored optical fiber with ultraviolet light can be regarded as not more than the saturated Young's modulus of the corresponding resin. The "saturated Young's modulus" of the first ultraviolet curing resin defines the Young's modulus of the first ultraviolet curing resin when the first ultraviolet curing resin is formed into a film on a glass plate and completely cured by irradiation with ultraviolet light at room temperature using a mercury lamp, UV-LED, or the like. The secondary layer 4 is preferably a hard layer having Young's modulus of larger than or equal to 500 MPa, and has a function of protecting the bare optical fiber 2 and the primary layer 3 from external force. The colored layer 5 is colored to identify the colored optical fiber 1. Further, the colored secondary layer 4 may be the outermost layer of the colored optical fiber 1. When the secondary layer 4 is colored, the secondary layer 4 is colored by adding a coloring agent obtained by mixing a pigment, a lubricant, or the like to the secondary layer 4. The content of the coloring agent in the colored secondary layer 4 can be appropriately determined depending on the content of the coloring agent contained in the coloring agent, the kind of other components such as the ultraviolet curing resin, or the like.

The diameter of the coated optical fiber is preferably smaller than or equal to 210 μm, for example, about 190 μm. The diameter of the bare optical fiber 2 may be larger than or equal to 80 μm and larger than or equal to 150 μm, preferably larger than or equal to 124 μm and smaller than or equal to 126 μm. The thickness of the primary layer 3 may be larger than or equal to 10 μm and smaller than or equal to 60 μm. The thickness of the secondary layer 4 may be larger than or equal to 10 μm and smaller than or equal to 60 μm. The thickness of the colored layer 5 may be several micrometers. Here, the diameter of the coated optical fiber may be defined by the sum of the diameter of the bare optical fiber 2, the length twice as long as the thickness of the primary layer 3, and the length twice as long as the thickness of the secondary layer 4. Accordingly, the diameter of the bare optical fiber 2, the thickness of the primary layer 3, and the thickness of the secondary layer 4 may be selected so that the diameter of the coated optical fiber is about 210 μm.

Figure 2:
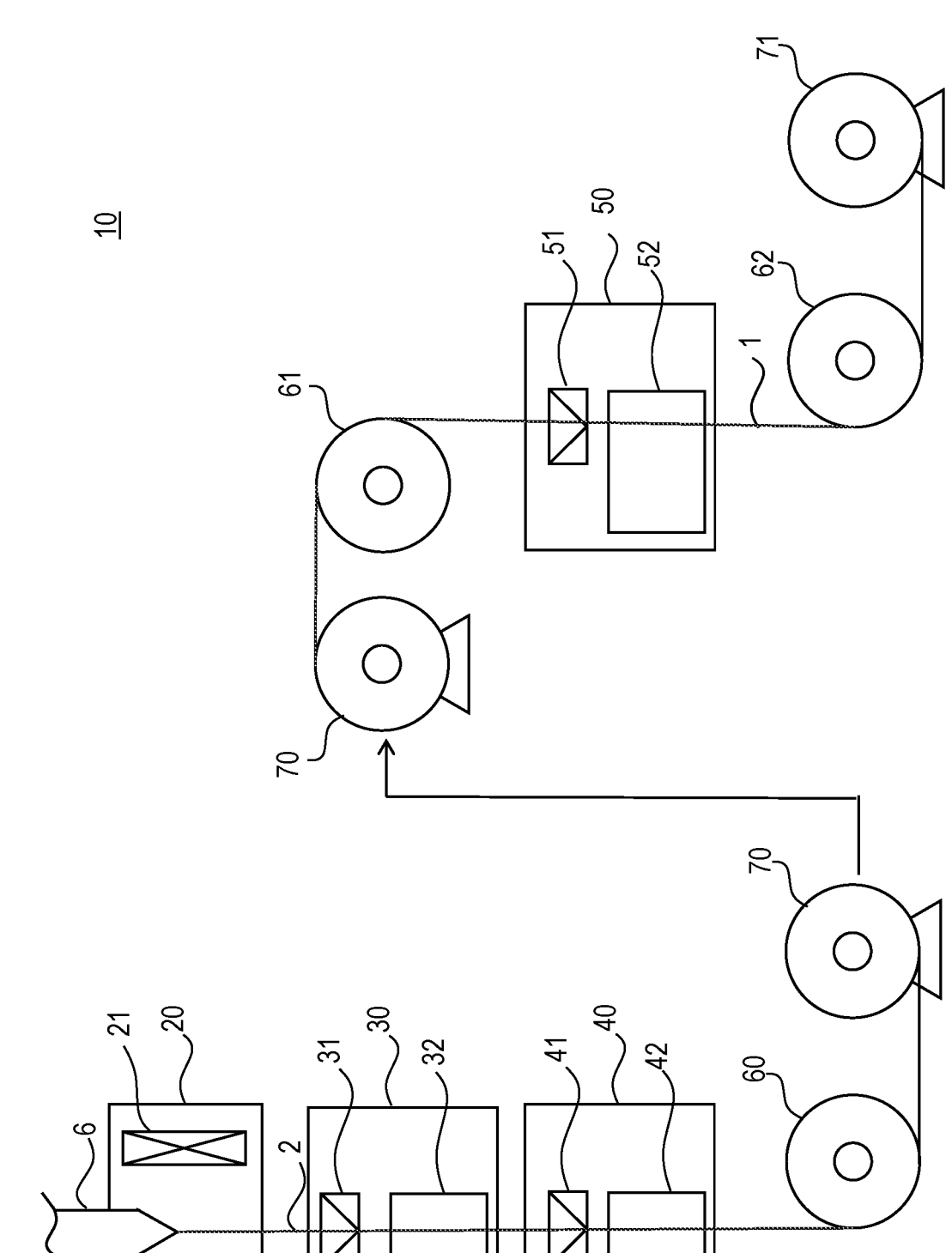
FIG. 2 is a schematic diagram of a manufacturing apparatus used in a method for manufacturing the colored optical fiber according to the first embodiment.

FIG. 2 is a schematic diagram of a manufacturing apparatus 10 used in a method for manufacturing the colored optical fiber 1 according to the first embodiment. The manufacturing apparatus 10 includes a heating apparatus 20, a primary layer covering apparatus 30, a secondary layer covering apparatus 40, a colored layer covering apparatus 50, guide rollers 60, 61 and 62, a bobbin 70 and a winding apparatus 71. The manufacturing apparatus 10 is an apparatus for manufacturing the colored optical fiber 1 from the optical fiber preform 6. The optical fiber preform 6 is made of quartz glass, for example, and is manufactured by a known method such as a VAD method, an OVD method, or an MCVD method. The heating apparatus 20 includes a heater 21. The heater 21 may be any heat source such as a tape heater, a ribbon heater, a rubber heater, an oven heater, a ceramic heater, a halogen heater, or the like. The end of the optical fiber preform 6 is heated and melted by using the heater 21 arranged around the optical fiber preform 6, and a bare optical fiber 2 is drawn by drawing.

Under the heating apparatus 20, a primary layer covering apparatus 30 is provided. The primary layer covering apparatus 30 includes a resin application apparatus 31 and an ultraviolet irradiation apparatus 32. The resin application apparatus 31 holds a first ultraviolet curing resin which is a covering material of the primary layer 3. The first ultraviolet curing resin is applied to the bare optical fiber 2 drawn from the optical fiber preform 6 by the resin application apparatus 31. The ultraviolet irradiation apparatus 32 is provided under the resin application apparatus 31. The ultraviolet irradiation apparatus 32 includes any ultraviolet light source such as a metal halide lamp, a mercury lamp, or an UV-LED. The first ultraviolet curing resin is applied to the bare optical fiber 2 by the resin application apparatus 31 and the bare optical fiber 2 enters the ultraviolet irradiation apparatus 32, and the first ultraviolet curing resin is irradiated with ultraviolet light. As a result, the first ultraviolet curing resin is cured to form the primary layer 3.

Under the primary layer covering apparatus 30, the secondary layer covering apparatus 40 is provided. The secondary layer covering apparatus 40 includes a resin application apparatus 41 and an ultraviolet irradiation apparatus 42. The resin application apparatus 41 holds a second ultraviolet curing resin which is a covering material of the secondary layer 4. The second ultraviolet curing resin is applied to the primary layer 3 by the resin application apparatus 41. The ultraviolet irradiation apparatus 42 is provided under the resin application apparatus 41. The ultraviolet irradiation apparatus 42 may have a configuration similar to that of the ultraviolet irradiation apparatus 32. The bare optical fiber 2 covered with the primary layer 3 enters the ultraviolet irradiation apparatus 42, and the second ultraviolet curing resin is irradiated with ultraviolet light. As a result, the second ultraviolet curing resin is cured to form the secondary layer 4. The bare optical fiber 2 is covered with the primary layer 3 and the secondary layer 4 and a coated optical fiber is formed. The coated optical fiber is guided by the guide roller 60 provided under the secondary layer covering apparatus 40, and wound around the bobbin 70. After the primary layer 3 and the secondary layer 4 are formed, the coated optical fiber is wound around the bobbin once, and then the colored layer 5 is formed.

The resin application apparatus 31 may be configured to hold the first ultraviolet curing resin and the second ultraviolet curing resin separately. In this case, the resin application apparatus 31 applies the first ultraviolet curing resin to the bare optical fiber 2, and subsequently applies the second ultraviolet curing resin to the first ultraviolet curing resin. The ultraviolet irradiation apparatus 32 irradiates the first ultraviolet curing resin and the second ultraviolet curing resin applied to the bare optical fiber 2 with ultraviolet light to form the primary layer 3 and the secondary layer 4. In this case, the manufacturing apparatus 10 does not necessarily need to include the secondary layer covering apparatus 40.

The bare optical fiber 2 wound around the bobbin 70 is guided by the guide roller 61 and enters the colored layer covering apparatus 50. The colored layer covering apparatus 50 includes a resin application apparatus 51 and an ultraviolet irradiation apparatus 52. The resin application apparatus 51 holds a third ultraviolet curing resin which is a covering material of the colored layer 5. The coated optical fiber is covered with the third ultraviolet curing resin by the resin application apparatus 51. The ultraviolet irradiation apparatus 52 is provided under the resin application apparatus 51. The ultraviolet irradiation apparatus 52 may be configured similarly to the ultraviolet irradiation apparatus 32 and 42. The coated optical fiber covered with the third ultraviolet curing resin on the outer periphery of the secondary layer 4 enters the ultraviolet irradiation apparatus 52, and the coated optical fiber is irradiated with ultraviolet light. As a result, the third ultraviolet curing resin containing the ultraviolet curing resin is cured to form the colored layer 5. The primary layer 3, the secondary layer 4, and the colored layer 5 are covered with the bare optical fiber 2 to form a colored optical fiber 1. The colored optical fiber 1 is guided by the guide roller 62 provided under the colored layer covering apparatus 50 and wound by the winding apparatus 71.

Figure 3:
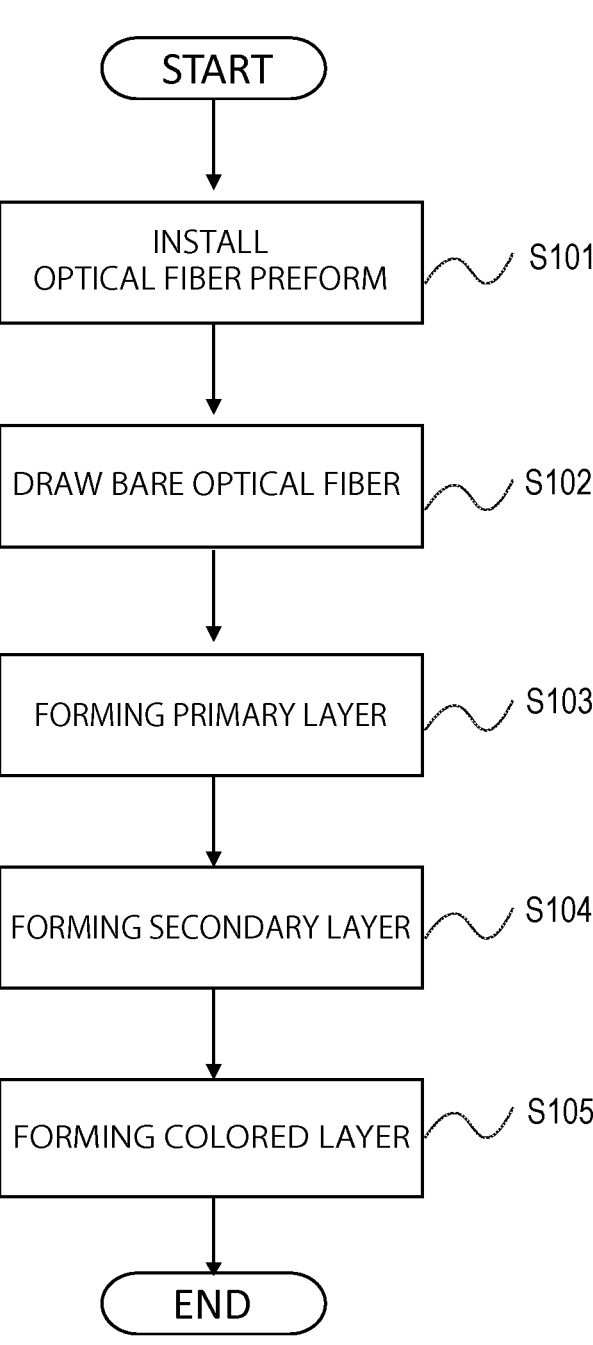
FIG. 3 is a flowchart of the method for manufacturing the colored optical fiber according to the first embodiment.

FIG. 3 is a flowchart of a method for manufacturing the colored optical fiber 1 according to the first embodiment. First, a user installs the optical fiber preform 6 in the manufacturing apparatus 10 (step S101). Next, the heater 21 provided in the heating apparatus 20 heats the optical fiber preform 6 and starts drawing the bare optical fiber 2 (step S102).

The primary layer covering apparatus 30 forms the primary layer 3 by applying a first ultraviolet curing resin around the drawn bare optical fiber 2, and irradiating the first ultraviolet curing resin with ultraviolet light (step S103). Next, the secondary layer covering apparatus 40 forms the secondary layer 4 by applying a second ultraviolet curing resin around the primary layer 3, and irradiating the second ultraviolet curing resin with ultraviolet light (step S104). Thus, a coated optical fiber is obtained. Subsequently, the colored layer covering apparatus 50 forms the colored layer 5 by applying a third ultraviolet curing resin containing an ultraviolet curing resin around the secondary layer 4, and irradiating the third ultraviolet curing resin with ultraviolet light (step S105). The colored optical fiber 1 is obtained by coating the colored layer around the coated optical fiber. In the step of forming the primary layer 3 (step S103), it is not always necessary to irradiate ultraviolet light. In this case, the primary layer 3 can be cured by irradiation with ultraviolet light in the step of forming the secondary layer 4 (step S104) or the step of forming the colored layer 5 (step S105).

In the manufacturing process of the colored optical fiber 1, the ultraviolet light irradiation is performed in the step of forming the primary layer 3 (step S103), the step of forming the secondary layer 4 (step S104), and the step of forming the colored layer 5 (step S105). Accordingly, after the primary layer 3 is formed, the primary layer 3 is irradiated with ultraviolet light even in the forming of the secondary layer 4 and the colored layer 5, and the primary layer 3 can be cured. More specifically, ultraviolet light transmitted through the secondary layer 4 and the colored layer 5 is absorbed by the primary layer 3, and curing of the primary layer 3 can proceed further. If the primary layer 3 is too cured, the Young's modulus of the primary layer 3 becomes high, and it may be difficult for the primary layer 3 to sufficiently buffer the external force applied to the bare optical fiber 2. This may result in microbend loss.

In the present embodiment, while the Young's modulus of the primary layer 3 is smaller than the saturated Young's modulus, curing of the primary layer 3 is suppressed, and microbend loss is effectively avoided. A method for suppressing curing of the primary layer 3 will be described below. The primary layer 3 is cured by polymerization of the first ultraviolet curing resin. The low molecular weight component contained in the first ultraviolet curing resin is partly volatilized, for example, under high temperature conditions after the drawing step (step S102). By irradiating the first ultraviolet curing resin with ultraviolet light while the first ultraviolet curing resin is at high temperature, high-temperature curing of the first ultraviolet curing resin proceeds. The high-temperature curing of the first ultraviolet curing resin proceeds, thereby suppressing the polymerization of the first ultraviolet curing resin. That is, by irradiating the first ultraviolet curing resin with ultraviolet light under the condition that the first ultraviolet curing resin is at a high temperature, progress of curing of the primary layer 3 can be suppressed, and the Young's modulus of the primary layer 3 can be kept small. At this time, the composition of the first ultraviolet curing resin is changed due to the high temperature of the first ultraviolet curing resin, and curing of the primary layer 3 is suppressed. In other words, the composition of the primary layer 3 is changed so as to suppress progress of curing. That is, curing of the primary layer 3 can be suppressed even when the colored optical fiber 1 is irradiated with additional ultraviolet light. The method for increasing the temperature of the first ultraviolet curing resin includes, for example, shortening the period from the end of the drawing step (step S102) to the start of the step of covering the primary layer 3 (step S103). In this case, since the first ultraviolet curing resin is applied around the bare optical fiber 2 at a relatively high temperature, the first ultraviolet curing resin can be irradiated with ultraviolet light in a state where the first ultraviolet curing resin is at a high temperature.

The method for suppressing the progress of curing of the primary layer 3 is not limited to a method for increasing the temperature of the first ultraviolet curing resin. Other methods include, for example, a method for adjusting the amount of additives contained in the first ultraviolet curing resin, and a method for adjusting the amount of ultraviolet light to be irradiated. By arbitrarily selecting or combining these methods, the method can be appropriately set so that the primary layer 3 having the required Young's modulus can be obtained.

In the present embodiment, the Young's modulus of the primary layer 3 is desirably set to smaller than or equal to 88% with respect to the saturated Young's modulus. By setting the Young's modulus of the primary layer 3 to be smaller than the saturated Young's modulus, the primary layer 3 having a sufficiently small Young's modulus can be obtained, and microbend loss can be effectively avoided. Therefore, even in the case of the colored optical fiber 1 having a small diameter, the microbend loss can be effectively suppressed.

Second Embodiment

An optical fiber ribbon, an apparatus for manufacturing an optical fiber ribbon, and a manufacturing method thereof according to a second embodiment of the present invention will be described. Components similar to those of the colored optical fiber 1, the manufacturing apparatus 10 and the manufacturing method for the colored optical fiber 1 according to the first embodiment are denoted by the same reference numerals, and description thereof will be omitted or simplified.

In the present embodiment, as an example of a cable to which the colored optical fiber 1 according to the first embodiment is applied, an optical fiber ribbon composed of the colored optical fiber 1 according to the first embodiment will be described. An example of the application of the colored optical fiber 1 according to the first embodiment is not limited to the form of an optical fiber ribbon, and may be, for example, a form of an assembly cable of single fibers in which the colored optical fiber is accommodated by a sheath or a form of optical fiber ribbon cable in which the optical fiber ribbon is accommodated by a sheath.

Figure 4:
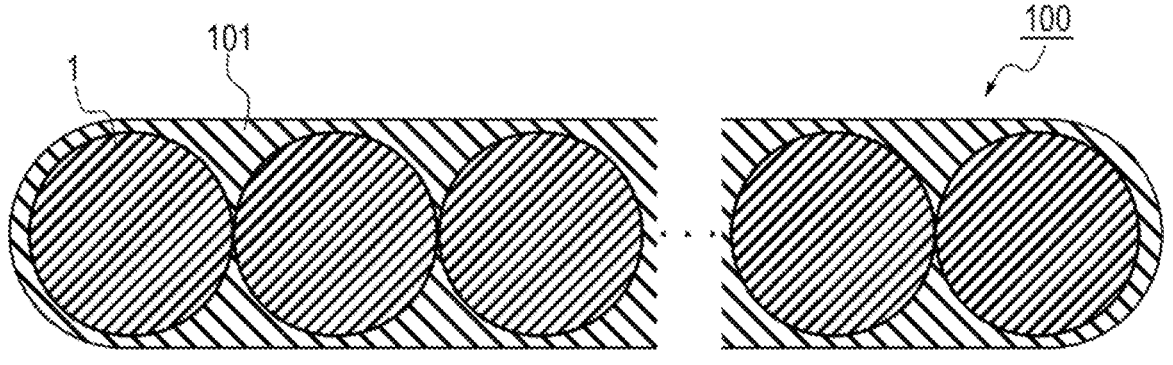
FIG. 4 is a cross-sectional view of an optical fiber ribbon according to a second embodiment.

FIG. 4 is a cross-sectional view of an optical fiber ribbon 100 according to a second embodiment. The optical fiber ribbon 100 is formed by bundling a plurality of colored optical fibers 1 in a band shape via an adhesive layer 101. The adhesive layer 101 is formed by irradiating a covering material containing an ultraviolet curing resin with ultraviolet light to be cured. The ultraviolet curing resin forming the adhesive layer 101 is made of a resin similar to the ultraviolet curing resin forming the primary layer 3, the secondary layer 4, and the colored layer 5. The colored optical fiber 1 can be bundled in high density by taking the form of an optical fiber ribbon 100. The optical fiber ribbon 100 is not limited to the configuration illustrated in FIG. 4. Further, the optical fiber ribbon 100 may take the form of an optical fiber ribbon cable accommodated by a sheath.

Figure 5:
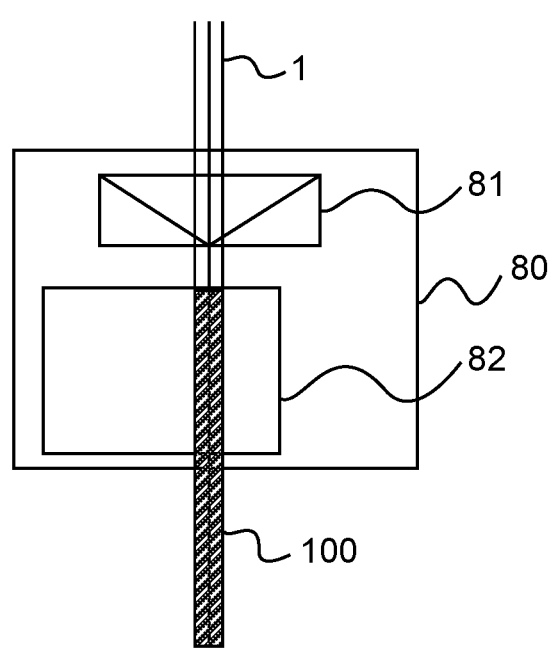
FIG. 5 is a schematic diagram of a manufacturing apparatus used in the method for manufacturing an optical fiber ribbon according to the second embodiment.

FIG. 5 is a schematic diagram of a ribbon forming apparatus 80 used in a method for manufacturing the optical fiber ribbon 100 according to the second embodiment. The ribbon forming apparatus 80 is provided with a resin application apparatus 81 and the resin application apparatus 81 holds a fourth ultraviolet curing resin which is a covering material of the adhesive layer 101. The ribbon forming apparatus 80 is provided with an ultraviolet irradiation apparatus 82 similar to an ultraviolet light source similar to the ultraviolet light sources provided in the ultraviolet irradiation apparatuses 32, 42, and 52. A plurality of prepared colored optical fibers 1 enter the ribbon forming apparatus 80, and the fourth ultraviolet curing resin is applied by the resin application apparatus 81. The colored optical fiber 1 applied to the fourth ultraviolet curing resin is bundled together with a plurality of other colored optical fibers 1 applied to the fourth ultraviolet curing resin. The bundled plurality of colored optical fibers 1 are irradiated with ultraviolet light by the ultraviolet light source 82 provided in the ribbon forming apparatus 80. As a result, the fourth ultraviolet curing resin is cured to form the adhesive layer 101. A plurality of colored optical fibers 1 arranged in parallel are connected via the adhesive layer 101. In this way, the optical fiber ribbon 100 is formed from the colored optical fiber 1 having a small diameter. Also in the present embodiment, it is possible to effectively suppress the microbend loss of the colored optical fiber 1 having a small diameter.

FIG. 6 is a flowchart of the method for manufacturing the optical fiber ribbon 100 according to the second embodiment. Steps S101 to S105 are similar to those in the first embodiment. In the flowchart of FIG. 6, in addition to the flowchart of the first embodiment, a ribbon forming step of the colored optical fiber 1 is performed. That is, after the colored layer 5 is formed in step S105, the ribbon forming apparatus 80 applies a fourth ultraviolet curing resin to a plurality of prepared colored optical fibers 1, and irradiates the fourth ultraviolet curing resin with ultraviolet light to connect the plurality of colored optical fibers 1 (step S106). Thus, the optical fiber ribbon 100 is manufactured.

In the process of manufacturing the optical fiber ribbon 100 from the colored optical fiber 1, the colored optical fiber 1 is irradiated with ultraviolet light. Further, the colored optical fiber 1 can suppress curing of the primary layer 3 even when additional ultraviolet irradiation is performed after manufacturing. Therefore, even in the ribbon forming step of the colored optical fiber 1, curing of the primary layer 3 due to irradiation with ultraviolet light can be suppressed. Therefore, it is possible to effectively suppress microbend loss in a colored optical fiber 1 having a small diameter included in the optical fiber ribbon 100.

EXAMPLES

Hereinafter, experimental results of a colored optical fiber 1 according to an embodiment of the present invention will be described.

TABLE 1

| | Saturated Young's modulus MPa | Young's modulus MPa | Young's modulus/ saturated Young's modulus % | Young's modulus after additional ultraviolet irradiation MPa | Young's modulus after additional ultraviolet irradiation/ saturated Young's modulus % | Change amount of Young's modulus Mpa | Evaluation 1 | Evaluation 2 | Evaluation 3 |
|---|---|---|---|---|---|---|---|---|---|
| Example 1 | 1.80 | 0.75 | 41.9 | 0.79 | 44.2 | 0.04 | OK | OK | OK |
| Example 2 | 1.80 | 0.81 | 45.3 | 0.86 | 47.8 | 0.05 | OK | OK | OK |
| Example 3 | 1.80 | 0.82 | 45.6 | 1.10 | 61.1 | 0.28 | OK | OK | OK |
| Example 4 | 1.80 | 1.42 | 78.8 | 1.47 | 82.0 | 0.06 | OK | OK | OK |
| Example 5 | 1.54 | 0.39 | 25.3 | 0.43 | 27.9 | 0.04 | OK | OK | OK |

TABLE 1-continued

| | Saturated Young's modulus MPa | Young's modulus MPa | Young's modulus/ saturated Young's modulus % | Young's modulus after additional ultraviolet irradiation MPa | Young's modulus after additional ultraviolet irradiation/ saturated Young's modulus % | Change amount of Young's modulus Mpa | Evaluation 1 | Evaluation 2 | Evaluation 3 |
|---|---|---|---|---|---|---|---|---|---|
| Example 6 | 1.30 | 0.30 | 23.1 | 0.33 | 25.4 | 0.03 | OK | OK | OK |
| Example 7 | 1.30 | 0.48 | 37.2 | 0.54 | 41.4 | 0.05 | OK | OK | OK |
| Example 8 | 1.30 | 0.90 | 69.3 | 1.14 | 87.9 | 0.24 | OK | OK | OK |
| Example 9 | 0.96 | 0.74 | 77.1 | 0.80 | 83.3 | 0.06 | OK | OK | OK |
| Example 10 | 0.85 | 0.61 | 71.6 | 0.66 | 77.4 | 0.05 | OK | OK | OK |
| Example 11 | 0.78 | 0.67 | 85.8 | 0.68 | 87.8 | 0.02 | OK | OK | OK |
| Example 12 | 0.40 | 0.21 | 52.5 | 0.27 | 67.5 | 0.06 | OK | OK | OK |
| Example 13 | 0.30 | 0.16 | 52.0 | 0.25 | 81.7 | 0.09 | OK | OK | OK |
| Comparative Example 1 | 1.30 | 0.23 | 18.1 | 1.28 | 98.7 | 1.05 | OK | OK | NG |
| Comparative Example 2 | 1.30 | 1.15 | 88.4 | — | — | — | OK | NG | — |
| Comparative Example 3 | 0.40 | 0.07 | 17.5 | — | — | — | NG | — | — |

Table 1 illustrates Young's modulus of the primary layer 3 and evaluations of the microbend loss in Examples and Comparative Examples of the colored optical fiber 1. That is, Table 1 illustrates saturated Young's modulus (MPa), Young's modulus (MPa), Young's modulus/saturated Young's modulus (%), Young's modulus after additional ultraviolet irradiation (MPa), Young's modulus after additional ultraviolet irradiation/saturated Young's modulus (%), the change amount of Young's modulus (MPa), an evaluation of adhesion between the bare optical fiber 2 and the primary layer 3 (Evaluation 1), and evaluations of microbend loss (Evaluations 2 and 3) in Examples 1 to 13 and Comparative Examples 1 to 3. The outer diameter of the secondary layer 4 of the colored optical fiber 1 in Examples 1 to 13 and Comparative Examples 1 to 3 was 210 μm.

The "saturated Young's modulus" in Table 1 is the Young's modulus when a first ultraviolet curing resin is formed into a film on a glass plate and irradiated with ultraviolet light at room temperature using a mercury lamp, UV-LED, or the like to be completely cured. The "Young's modulus" in Table 1 is ISM (In Situ Modulus) of the primary layer 3 of the colored optical fiber 1. In the present specification, ISM is defined as measured by the following method. First, using a commercially available stripper, the primary layer 3 and the secondary layer 4 of the intermediate portion of the optical fiber serving as a sample are peeled off by a length of several millimeters, and then one end of the optical fiber on which the covering layer is formed is fixed on the slide glass with an adhesive, and a load F is applied to the other end of the optical fiber on which the covering layer is formed. In this state, a displacement δ of the primary layer 3 at the boundary between the portion where the covering layer is peeled off and the portion where the covering layer is formed is read by a microscope. Then, by setting the load F to 10, 20, 30, 50, and 70 gf (that is, 98, 196, 294, 490, and 686 mN sequentially), a graph of the displacement δ with respect to the load F is created. Then, the primary elastic modulus is calculated using the slope obtained from the graph and the following equation (1). Since the calculated primary elastic modulus corresponds to the so-called ISM, the primary elastic modulus is appropriately referred to as P-ISM in the following description. When drawing the colored optical fiber 1, the drawing speed and the illuminance of the ultraviolet were controlled in order to adjust the P-ISM.

[Math 1]

$$P\text{-}ISM = (3F/\delta)*(1/2\pi l)*\ln(DP/DG) \qquad \text{(equation (1))}$$

Here, the unit of P-ISM is [MPa]. Further, F/δ is an inclination indicated by a graph of the displacement (δ) [μm] with respect to the load (F) [gf], l is a sample length (for example, 10 mm), and DP/DG is a ratio between the outer diameter (DP) [μm] of the primary layer and the outer diameter (DG) [μm] of the cladding portion of the optical fiber. Therefore, in the case of calculating P-ISM from F, δ, and l used, it is necessary to perform predetermined unit conversion. The outer diameter of the primary layer 3 and the outer diameter of the cladding portion can be measured by observing the cross section of the optical fiber cut by the fiber cutter with a microscope.

The "Young's modulus after additional ultraviolet irradiation" in Table 1 is the P-ISM of the primary layer 3 when the manufactured colored optical fiber 1 was additionally irradiated with ultraviolet light at 1000 mW/cm$^2$ and 500 mJ/cm$^2$ using D bulb. The "change amount of Young's modulus" is a value of a change amount from the "Young's modulus" to the "Young's modulus after additional ultraviolet irradiation". In curing an ultraviolet curing resin, a side reaction such as a polymerization stop reaction occurs due to an increase in reaction temperature, and curing does not proceed sufficiently, so that the Young's modulus of the cured product decreases. Here, in a drawing step of an optical fiber, since an ultraviolet curing resin is heated to a temperature higher than room temperature and cured, the Young's modulus of the ultraviolet curing resin is smaller than that in the case where the ultraviolet curing resin formed into a film on a glass plate is cured at room temperature. Further, even in the case of an ultraviolet curing resin which is partially cured at a high temperature, even if ultraviolet irradiation is subsequently added, the Young's modulus of the cured product is smaller than that in the case where the ultraviolet curing resin is completely cured at room temperature. In other words, the Young's modulus of the coated optical fiber or the colored optical fiber or the Young's modulus increased by additionally irradiating the coated optical fiber or the colored optical fiber with ultraviolet light can be regarded as being smaller than or equal to the saturated Young's modulus of the resin.

"Evaluation 1" in Table 1 indicates whether or not adhesion between the bare optical fiber 2 and the primary layer

3 is maintained when a load of 70 gf is applied to the primary layer 3 during ISM measurement. When a load of 70 gf is applied to the primary layer 3, the Evaluation 1 is determined to be good (OK) when the primary layer 3 is held by the bare optical fiber 2, and the Evaluation 1 is determined to be poor (NG) when the primary layer 3 is detached from the bare optical fiber 2. The Evaluation 1 may represent the extent of bonding between the primary layer 3 and the bare optical fiber 2 by a silane coupling agent or the like, and may be an indicator for determining whether the primary layer 3 can at least hold the bare optical fibers 2. "Evaluation 2" in Table 1 indicates whether or not the microbend loss in the colored optical fiber 1 before additional irradiation with ultraviolet light meets the standard (smaller than or equal to 1.0 dB/km). "Evaluation 3" represents whether or not the microbend loss in the colored optical fiber 1 after additional irradiation with ultraviolet light meets the standard (smaller than or equal to 1.0 dB/km). When the microbend loss meets the standard, the Evaluations 2 and 3 are defined to be good (OK), and when the microbend loss does not meet the standard, the Evaluations 2 and 3 are defined to be poor (NG). Typically, a colored optical fiber 1 with a coated optical fiber having a small diameter has a relatively thin primary layer 3 and secondary layer 4. Therefore, in the case of the colored optical fiber 1 with the coated optical fiber having a small diameter, the primary layer 3 cannot sufficiently buffer the external force, and the microbend loss can be increased. The standard for Evaluations 2 and 3 (smaller than or equal to 1.0 dB/km) can be the indicator for determining whether or not the colored optical fiber 1 occurs a large microbend loss. In other words, the Evaluations 2 and 3 can be used as indicator for determining whether or not the colored optical fiber 1 with coated optical fiber having a small diameter occurs a large microbend loss.

There are various methods of measuring microbend loss. In the present specification, A microbend loss value defines a difference between a transmission loss of an optical fiber to be measured in a state A in which optical fibers having a length of greater than or equal to 400 m are wound around a large bobbin wound a sandpaper #1000 thereon in one layer so as not to overlap each other with a tension of 100 gf, and a transmission loss of an optical fiber in state B wound on the same bobbin as state A with the same tension and length as state A which is not wound around a sandpaper. Here, the transmission loss of the optical fiber in the state B does not include the microbend loss, and is considered to be a transmission loss inherent to the optical fiber itself. This measuring method is similar to the fixed diameter drum method defined in JIS C6823:2010. This measuring method is also referred to as a sandpaper method. Further, in this measuring method, since the transmission loss is measured at a wavelength of 1550 nm, the following microbend loss is also a value at a wavelength of 1550 nm.

The effective core cross-sectional area (effective core cross-sectional area) is an index indicating the easiness of microbend loss of the optical fiber. The effective core cross-sectional area is represented by the following equation (2).

[Math 2]

$$(\text{Effective core cross sectional area}) = (\pi k/4)*(\text{MFD})^2 \quad (\text{equation (2)})$$

Here, the effective core cross-sectional area is a value at a wavelength of 1550 nm, MFD is a mode field diameter (μm), and k is a constant. The effective core cross-sectional area represents an area of a portion through which light having a predetermined intensity passes in a cross-section orthogonal to the axis of the bare optical fiber 2. Generally, the larger the effective core cross-sectional area of the bare optical fiber 2, the weaker the optical confinement in the cross section of the bare optical fiber 2. That is, when the effective core cross-sectional area of the bare optical fiber 2 is large, light in the bare optical fiber 2 tends to leak by an external force applied to the bare optical fiber 2. Therefore, when the effective core cross-sectional area of the bare optical fiber 2 becomes large, microbend loss of the colored optical fiber 1 tends to occur.

Here, the colored optical fiber 1 according to the embodiment of the present invention includes a primary layer 3 capable of effectively buffering an external force applied to the colored optical fiber 1. Therefore, by sufficiently buffering the external force applied to the colored optical fiber 1 by the primary layer 3, the external force applied to the bare optical fiber 2 can be sufficiently reduced. Thus, even when the effective core cross-sectional area of the bare optical fiber 2 is large, the microbend loss of the optical fiber can be effectively suppressed.

Further, by increasing the effective core cross-sectional area of the bare optical fiber 2, the light intensity per unit area of the cross section of the bare optical fiber 2 can be reduced. Thus, the nonlinear optical effect caused by the light in the bare optical fiber 2 can be suppressed. Accordingly, the colored optical fiber 1 of Examples 1 to 13 and Comparative Examples 1 to 3 preferably have an effective core cross-sectional area larger than or equal to 100 μm² and smaller than or equal to 150 μm², for example, larger than or equal to 120 μm² and smaller than or equal to 160 μm². Thus, it is possible to obtain the colored optical fiber 1 capable of suppressing the nonlinear optical effect caused by the light in the bare optical fiber 2.

In Example 1, a first ultraviolet curing resin having a saturated Young's modulus of 1.80 MPa was used. The first ultraviolet curing resin was ultraviolet-cured until Young's modulus of Example 1 became 0.75 MPa and the ratio of the Young's modulus to the saturated Young's modulus was 41.9% which was smaller than or equal to 88%. Young's modulus after the additional ultraviolet irradiation was 0.79 MPa, and the ratio of the Young's modulus after additional ultraviolet irradiation to the saturated Young's modulus was 44.2%. Change amount of Young's modulus was 0.04 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 2, a first ultraviolet curing resin having a saturated Young's modulus of 1.80 MPa was used. The first ultraviolet curing resin was ultraviolet-cured until Young's modulus of Example 2 became 0.81 MPa and the ratio of the Young's modulus to the saturated Young's modulus was 45.3% which was smaller than or equal to 88%. Young's modulus after the additional ultraviolet irradiation was 0.86 MPa, and the ratio of the Young's modulus after additional ultraviolet irradiation to the saturated Young's modulus was 47.8%. Change amount of Young's modulus was 0.05 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 3, a first ultraviolet curing resin having a saturated Young's modulus of 1.80 MPa was used. The first ultraviolet curing resin was ultraviolet-cured until Young's modulus of Example 3 became 0.82 MPa and the ratio of the Young's modulus to the saturated Young's modulus was 45.6% which was smaller than or equal to 88%. Young's modulus after the additional ultraviolet irradiation was 1.10 MPa, and the ratio of the Young's modulus after additional ultraviolet irradiation to the saturated Young's modulus was 61.1%. Change amount of Young's modulus was 0.28 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 4, a first ultraviolet curing resin having a saturated Young's modulus of 1.80 MPa was used. The first ultraviolet curing resin was ultraviolet-cured until Young's modulus of Example 4 became 1.42 MPa and the ratio of the Young's modulus to the saturated Young's modulus was 78.8% which was smaller than or equal to 88%. Young's modulus after the additional ultraviolet irradiation was 1.47 MPa, and the ratio of the Young's modulus after additional ultraviolet irradiation to the saturated Young's modulus was 82.0%. Change amount of Young's modulus was 0.06 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 5, a first ultraviolet curing resin having a saturated Young's modulus of 1.54 MPa was used. The first ultraviolet curing resin was ultraviolet-cured until Young's modulus of Example 5 became 0.39 MPa and the ratio of the Young's modulus to the saturated Young's modulus was 25.3% which was smaller than or equal to 88%. Young's modulus after the additional ultraviolet irradiation was 0.43 MPa, and the ratio of the Young's modulus after additional ultraviolet irradiation to the saturated Young's modulus was 27.9%. Change amount of Young's modulus was 0.04 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 6, a first ultraviolet curing resin having a saturated Young's modulus of 1.30 MPa was used. The first ultraviolet curing resin was ultraviolet-cured until Young's modulus of Example 6 became 0.30 MPa and the ratio of the Young's modulus to the saturated Young's modulus was 23.1% which was smaller than or equal to 88%. Young's modulus after the additional ultraviolet irradiation was 0.33 MPa, and the ratio of the Young's modulus after additional ultraviolet irradiation to the saturated Young's modulus was 25.4%. Change amount of Young's modulus was 0.03 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 7, a first ultraviolet curing resin having a saturated Young's modulus of 1.30 MPa was used. The first ultraviolet curing resin was ultraviolet-cured until Young's modulus of Example 7 became 0.48 MPa and the ratio of the Young's modulus to the saturated Young's modulus was 37.2% which was smaller than or equal to 88%. Young's modulus after the additional ultraviolet irradiation was 0.54 MPa, and the ratio of the Young's modulus after additional ultraviolet irradiation to the saturated Young's modulus was 41.4%. Change amount of Young's modulus was 0.05 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 8, a first ultraviolet curing resin having a saturated Young's modulus of 1.30 MPa was used. The first ultraviolet curing resin was ultraviolet-cured until Young's modulus of Example 8 became 0.90 MPa and the ratio of the Young's modulus to the saturated Young's modulus was 69.3% which was smaller than or equal to 88%. Young's modulus after the additional ultraviolet irradiation was 1.14 MPa, and the ratio of the Young's modulus after additional ultraviolet irradiation to the saturated Young's modulus was 87.9%. Change amount of Young's modulus was 0.24 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 9, a first ultraviolet curing resin having a saturated Young's modulus of 0.96 MPa was used. The first ultraviolet curing resin was ultraviolet-cured until Young's modulus of Example 9 became 0.74 MPa and the ratio of the Young's modulus to the saturated Young's modulus was 77.1% which was smaller than or equal to 88%. Young's modulus after the additional ultraviolet irradiation was 0.80 MPa, and the ratio of the Young's modulus after additional ultraviolet irradiation to the saturated Young's modulus was 83.3%. Change amount of Young's modulus was 0.06 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 10, a first ultraviolet curing resin having a saturated Young's modulus of 0.85 MPa was used. The first ultraviolet curing resin was ultraviolet-cured until Young's modulus of Example 10 became 0.61 MPa and the ratio of the Young's modulus to the saturated Young's modulus was 71.6% which was smaller than or equal to 88%. Young's modulus after the additional ultraviolet irradiation was 0.66 MPa, and the ratio of the Young's modulus after additional ultraviolet irradiation to the saturated Young's modulus was 77.4%. Change amount of Young's modulus was 0.05 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 11, a first ultraviolet curing resin having a saturated Young's modulus of 0.78 MPa was used. The first ultraviolet curing resin was ultraviolet-cured until Young's modulus of Example 11 became 0.67 MPa and the ratio of the Young's modulus to the saturated Young's modulus was 85.8% which was smaller than or equal to 88%. Young's modulus after the additional ultraviolet irradiation was 0.68 MPa, and the ratio of the Young's modulus after additional ultraviolet irradiation to the saturated Young's modulus was 87.8%. Change amount of Young's modulus was 0.02 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 12, a first ultraviolet curing resin having a saturated Young's modulus of 0.40 MPa was used. The first ultraviolet curing resin was ultraviolet-cured until Young's modulus of Example 12 became 0.21 MPa and the ratio of the Young's modulus to the saturated Young's modulus was 52.5% which was smaller than or equal to 88%. Young's modulus after the additional ultraviolet irradiation was 0.27 MPa, and the ratio of the Young's modulus after additional ultraviolet irradiation to the saturated Young's modulus was 67.5%. Change amount of Young's modulus was 0.06 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Example 13, a first ultraviolet curing resin having a saturated Young's modulus of 0.30 MPa was used. The first ultraviolet curing resin was ultraviolet-cured until Young's modulus of Example 13 became 0.16 MPa and the ratio of the Young's modulus to the saturated Young's modulus was 52.0% which was smaller than or equal to 88%. Young's modulus after the additional ultraviolet irradiation was 0.25 MPa, and the ratio of the Young's modulus after additional ultraviolet irradiation to the saturated Young's modulus was 81.7%. Change amount of Young's modulus was 0.09 MPa. When a load was applied to the primary layer 3, the primary layer 3 was held by the bare optical fiber 2, and the Evaluation 1 was good (OK). The microbend loss before and after the additional irradiation with ultraviolet light was smaller than or equal to 1.0 dB/km, and the Evaluations 2 and 3 were good (OK).

In Comparative Example 1, a first ultraviolet curing resin having a saturated Young's modulus of 1.30 MPa was used. The first ultraviolet curing resin was ultraviolet-cured until Young's modulus of Comparative Example 1 became 0.23 MPa and the ratio of the Young's modulus to the saturated Young's modulus was 18.1%. Young's modulus after the additional ultraviolet irradiation was 1.28 MPa, and the ratio of the Young's modulus after additional ultraviolet irradiation to the saturated Young's modulus was 98.7% which was larger than 88%. Change amount of Young's modulus was 1.05 MPa. When a load was applied to the primary layer 3, the primary layer 3 was held by the bare optical fiber 2, and the Evaluation 1 was good (OK). The microbend loss was smaller than or equal to 1.0 dB/km, and the Evaluation 2 was good (OK) but the microbend loss after the additional irradiation with ultraviolet light was larger than 1.0 dB/km, and the Evaluation 3 was poor (NG).

In Comparative Example 2, a first ultraviolet curing resin having a saturated Young's modulus of 1.30 MPa was used. The first ultraviolet curing resin was ultraviolet-cured until Young's modulus of Comparative Example 2 became 1.15 MPa and the ratio of the Young's modulus to the saturated Young's modulus was 88.4% which was larger than 88%. When a load was applied to the primary layer 3, the primary layer 3 was held by the bare optical fiber 2, and the Evaluation 1 was good (OK). However, the microbend loss was larger than 1.0 dB/km, and the Evaluation 2 was poor (NG).

In Comparative Example 3, a first ultraviolet curing resin having a saturated Young's modulus of 0.40 MPa was used. The first ultraviolet curing resin was ultraviolet-cured until Young's modulus of Comparative Example 3 became 0.07 MPa and the ratio of the Young's modulus to the saturated Young's modulus was 17.5%. When Young's modulus of the primary layer 3 is small, curing of the primary layer 3 may be insufficient. When curing of the primary layer 3 is insufficient, adhesion between the bare optical fiber 2 and the primary layer 3 is weakened. When a load was applied to the primary layer 3, the primary layer 3 was peeled off from the bare optical fiber 2, and the Evaluation 1 was poor (NG).

According to the experimental results of Examples 1 to 13 and Comparative Examples 1 to 3, the Young's modulus of the primary layer is preferably smaller than or equal to 88% with respect to the saturated Young's modulus of the primary layer. Therefore, microbend loss of the colored optical fiber 1 can be effectively suppressed.

In addition, the Young's modulus of the primary layer 3 is preferably larger than or equal to 0.16 MPa. Thus, it is possible to obtain the colored optical fiber 1 in which the bare optical fiber 2 and the primary layer 3 sufficiently adhere to each other.

In addition, the Young's modulus of the primary layer 3 is preferably larger than or equal to 23% with respect to the saturated Young's modulus of the primary layer 3 and the ratio of the Young's modulus after additional ultraviolet irradiation to the saturated Young's modulus is preferably smaller than or equal to 88% and change amount of Young's modulus before and after the additional irradiation with ultraviolet light is preferably smaller than or equal to 0.28 MPa. Thus, an increase in microbend loss due to curing of the primary layer 3 can be suppressed when additional ultraviolet light is irradiated to the manufactured colored optical fiber 1.

As described above, according to the present embodiment, the primary layer 3 having a sufficiently low Young's modulus can be realized, and the microbend loss of the colored optical fiber 1 having a small diameter can be effectively suppressed.

The present invention is not limited to the embodiments described above, and various modifications are possible. For example, an example in which a configuration of a part of any embodiment is added to another embodiment or an example in which a configuration of a part of another embodiment is substituted is also an embodiment of the present invention. In addition, a known technique or a known technique in the technical field can be appropriately applied to a specific description or a portion not illustrated in the embodiments.

What is claimed is:

1. A colored optical fiber comprising:
a bare optical fiber;
a primary layer formed of a first ultraviolet curing resin covering the bare optical fiber; and
a secondary layer formed of a second ultraviolet curing resin covering the primary layer, wherein an outer diameter of the secondary layer is smaller than or equal to 210 μm,
wherein a Young's modulus of the primary layer is smaller than or equal to 88% with respect to a saturated Young's modulus of the primary layer, and wherein a Young's modulus of the primary layer after the colored optical fiber is additionally irradiated with ultraviolet light of 1000 mW/cm² and 500 mJ/cm² using a D bulb is larger than or equal to 25.4% and smaller than or equal to 87.9% with respect to a saturated Young's modulus of the primary layer.

2. The colored optical fiber according to claim 1, wherein a Young's modulus of the primary layer is larger than or equal to 0.16 MPa.

3. The colored optical fiber according to claim 1, wherein a Young's modulus of the primary layer is larger than or equal to 23% with respect to a saturated Young's modulus of the primary layer.

4. The colored optical fiber according to claim 1, wherein a change amount of a Young's modulus before and after an additional irradiation with ultraviolet light to the colored optical fiber is smaller than or equal to 0.28 MPa.

5. The colored optical fiber according to claim 1, wherein an adhesion force between the primary layer of 10 mm and the bare optical fiber is larger than or equal to 70 gf.

6. An optical fiber ribbon comprising:
a plurality of the colored optical fibers according to claim 1; and
an adhesive layer connecting the plurality of the colored optical fibers.

7. An optical fiber ribbon cable comprising:
the optical fiber ribbon according to claim 6 and;
a sheath accommodating the optical fiber ribbon.

8. An assembly cable of single fibers comprising:
a plurality of the colored optical fiber according to claim 1; and
a sheath accommodating the plurality of the colored optical fiber.

9. The colored optical fiber according to claim 1, wherein a Young's modulus of the primary layer after the colored optical fiber is additionally irradiated with ultraviolet light of 1000 mW/cm² and 500 mJ/cm² using a D bulb is larger than or equal to 25.4% and smaller than or equal to 67.5% with respect to a saturated Young's modulus of the primary layer.

10. The colored optical fiber according to claim 1, wherein a Young's modulus of the primary layer is larger than or equal to 23.1% and smaller than or equal to 52.5% with respect to a saturated Young's modulus of the primary layer.

11. A method for manufacturing a colored optical fiber comprising:
a step of drawing a bare optical fiber from an optical fiber preform;
a step of forming a primary layer by applying a first ultraviolet curing resin around the bare optical fiber; and
a step of forming a secondary layer by applying a second ultraviolet curing resin around the primary layer and irradiating the second ultraviolet curing resin with ultraviolet light,
after manufacturing the colored optical fiber,
wherein an outer diameter of the secondary layer is smaller than or equal to 210 μm, and
wherein a Young's modulus of the primary layer is smaller than or equal to 88% with respect to a saturated Young's modulus of the primary layer.

12. The method for manufacturing a colored optical fiber according to claim 11, wherein in the step of forming the primary layer, the first ultraviolet curing resin is irradiated with ultraviolet light.

13. The method for manufacturing a colored optical fiber according to claim 11 further comprising a step of forming a colored layer by applying a third ultraviolet curing resin around the secondary layer and irradiating the third ultraviolet curing resin with ultraviolet light.

14. The method for manufacturing a colored optical fiber according to claim 11, wherein the secondary layer is colored.

15. A method for manufacturing an optical fiber ribbon comprising:
a step of preparing a plurality of the colored optical fibers according to claim 11; and
a step of connecting the plurality of colored optical fibers by applying a fourth ultraviolet curing resin to the plurality of colored optical fibers and irradiating the fourth ultraviolet curing resin with ultraviolet light.

* * * * *